US010717387B2

(12) United States Patent
Yano

(10) Patent No.: US 10,717,387 B2
(45) Date of Patent: Jul. 21, 2020

(54) ENGINE SOUND CONTROL DEVICE, ENGINE SOUND CONTROL METHOD, AND NON-TRANSITORY COMPUTER-READABLE MEDIUM

(71) Applicant: Mitsubishi Electric Corporation, Tokyo (JP)

(72) Inventor: Atsuyoshi Yano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/476,212

(22) PCT Filed: Mar. 3, 2017

(86) PCT No.: PCT/JP2017/008583
§ 371 (c)(1),
(2) Date: Jul. 5, 2019

(87) PCT Pub. No.: WO2018/158949
PCT Pub. Date: Sep. 7, 2018

(65) Prior Publication Data
US 2020/0001784 A1 Jan. 2, 2020

(51) Int. Cl.
*G06F 3/16* (2006.01)
*B60Q 5/00* (2006.01)
*G10K 15/02* (2006.01)

(52) U.S. Cl.
CPC ............. *B60Q 5/005* (2013.01); *G06F 3/165* (2013.01); *G10K 15/02* (2013.01); *B60L 2270/42* (2013.01)

(58) Field of Classification Search
CPC ......... B60Q 5/0005; G06F 3/165; G06F 3/16; G10K 15/02; B60L 2270/42; A63F 13/803; A63F 13/54
See application file for complete search history.

(56) References Cited

U.S. PATENT DOCUMENTS 6,356,185 B1 * 3/2002 Plugge ..................... G10H 1/00
340/384.3
2009/0134983 A1 5/2009 Tischer
(Continued)

FOREIGN PATENT DOCUMENTS

DE 19726271 A1 12/1998
DE 102009030820 A1 12/2010
(Continued)

OTHER PUBLICATIONS

Office Action issued in corresponding German Application No. 112017006946.7 dated Mar. 13, 2020.

*Primary Examiner* — Walter F Briney, III
(74) *Attorney, Agent, or Firm* — Birch, Stewart, Kolasch & Birch, LLP

(57) ABSTRACT

An engine sound control device includes: a setter to set point information including coordinates indicating one of multiple cells of a driving state space represented by a coordinate system with parameters indicating a driving state as axes, and spectral information of a target engine sound at the cell; a setter to set region information indicating a driving scene region; a processor to perform an interpolation process to calculate spectral information of an engine sound for each of target cells of the multiple cells for which the point information is not set, based on the point information and region information, and generate a map including spectral information of an engine sound at each cell, from the point information and information obtained by the process; a processor to output a control parameter based on the map; and a controller to cause a unit to output a sound based on the control parameter.

10 Claims, 10 Drawing Sheets

(56) References Cited

U.S. PATENT DOCUMENTS

| | | | |
|---|---|---|---|
| 2012/0106748 A1* | 5/2012 | Peachey | G10K 15/04 |
| | | | 381/61 |
| 2013/0230185 A1 | 9/2013 | Osawa et al. | |
| 2014/0079243 A1* | 3/2014 | Appell | H03G 3/32 |
| | | | 381/86 |

FOREIGN PATENT DOCUMENTS

| | | |
|---|---|---|
| JP | 1-140199 A | 6/1989 |
| JP | 2000-10576 A | 1/2000 |
| JP | 2015-82029 A | 4/2015 |

* cited by examiner

ENGINE SOUND CONTROL DEVICE, ENGINE SOUND CONTROL METHOD, AND NON-TRANSITORY COMPUTER-READABLE MEDIUM

TECHNICAL FIELD

The present invention relates to an engine sound control device and an engine sound control method for causing a sound output unit to output a control sound depending on a driving state that affects engine sound of an automobile, and an engine sound control program that causes a computer to perform the engine sound control method.

BACKGROUND ART

There is a desire to enjoy engine sound (exhaust sound) during driving of an automobile. Patent Literature 1 proposes a technique of outputting, from a speaker in an automobile, a pseudo engine sound (pseudo exhaust sound) in accordance with a desire of a driver of the automobile, thereby providing acceleration feeling to the driver.

Also, Patent Literature 2 proposes a technique of dividing the engine driving state into multiple areas with an accelerator position and an engine rotation speed of an automobile as parameters, storing, as digital data (sound source data), an actual engine sound recorded in the state substantially at a center of each of the multiple areas, and providing engine sounds of the stored digital data to an interior of the automobile.

Also, Patent Literature 3 proposes a pseudo sound providing system including storage means for storing a sound source and effect data that affects the sound source, generation means for generating pseudo engine sound data by applying an effect based on the effect data corresponding to driving state data to the sound source, and reproduction means for outputting a pseudo engine sound based on the generated data.

CITATION LIST

Patent Literature

Patent Literature 1: Japanese Patent Application Publication No. 1-140199 (Claims, and FIGS. 1 and 2)
Patent Literature 2: Japanese Patent Application Publication No. 2000-10576 (Abstract, and FIGS. 1-4)
Patent Literature 3: Japanese Patent Application Publication No. 2015-82029 (Abstract, and FIGS. 4 and 5)

SUMMARY OF INVENTION

Technical Problem

However, when sound source data is acquired using the techniques described in Patent Literatures 1 and 2, it is necessary to acquire sound source data (record sound of an actual engine) for a very large number of driving states (e.g., states determined by the combination of an accelerator position and an engine rotation speed), and thus considerable time and effort are required.

Also, in the system described in Patent Literature 3, when settings of effects are performed exhaustively for a large number of driving states in order to provide more natural effects to the pseudo engine sound, considerable time and effort are required.

Conversely, in the techniques described in Patent Literatures 1 to 3, reducing the number of pieces of sound source data or the number of set effects results in a situation where the pseudo engine sound changes discretely, thereby degrading the quality of the pseudo engine sound.

The present invention has been made to solve the above problems, and is intended to provide an engine sound control device that can reduce effort by a user in operation for setting engine sounds and that can provide high-quality engine sound, and an engine sound control method and an engine sound control program that can reduce effort by the user in operation for setting engine sounds and that make it possible to provide high-quality engine sound.

Solution to Problem

An engine sound control device according to an aspect of the present invention is an engine sound control device to cause a sound output unit to output a control sound depending on a driving state of an automobile that affects engine sound of the automobile, the engine sound control device including: a target engine sound setter to set user set point information on a basis of a user command in accordance with input operation performed by a user on an operation unit, the user set point information including specified coordinates indicating one of a plurality of cells obtained by dividing a driving state space represented by a coordinate system with a plurality of parameters indicating the driving state as coordinate axes, and spectral information of a target engine sound at the cell indicated by the specified coordinates; a driving scene region setter to set driving scene region information indicating a driving scene region in the driving state space, on a basis of the user command; a first interpolation processor to perform a first interpolation process to calculate spectral information of an engine sound for each of one or more first interpolation target cells that are one or more cells of the plurality of cells for which the user set point information is not set, on a basis of the user set point information and the driving scene region information, and generate an engine sound setting map including spectral information of an engine sound at each of the plurality of cells, from the user set point information and first interpolation information obtained by the first interpolation process; a parameter conversion processor to output an engine sound control parameter based on the engine sound setting map; and an engine sound controller to cause the sound output unit to output the control sound based on the engine sound control parameter.

An engine sound control method according to another aspect of the present invention is an engine sound control method for causing a sound output unit to output a control sound depending on a driving state of an automobile that affects engine sound of the automobile, the engine sound control method including: a target engine sound setting step of setting user set point information on a basis of a user command in accordance with input operation performed by a user on an operation unit, the user set point information including specified coordinates indicating one of a plurality of cells obtained by dividing a driving state space represented by a coordinate system with a plurality of parameters indicating the driving state as coordinate axes, and spectral information of a target engine sound at the cell indicated by the specified coordinates; a driving scene region setting step of setting driving scene region information indicating a driving scene region in the driving state space, on a basis of the user command; a first interpolation step of performing a first interpolation process to calculate spectral information of an engine sound for each of one or more first interpolation target cells that are one or more cells of the plurality of cells for which the user set point information is not set, on a basis of the user set point information and the driving scene region information, and generating an engine sound setting map including spectral information of an engine sound at each of the plurality of cells, from the user set point information and first interpolation information obtained by the first interpolation process; a parameter conversion step of outputting an engine sound control parameter based on the engine sound setting map; and a control sound generation step of causing the sound output unit to output the control sound based on the engine sound control parameter.

Advantageous Effects of Invention

According to the present invention, it is possible in an automobile to reduce effort by a user in operation for setting engine sounds and provide high-quality engine sound desired by the user.

DESCRIPTION OF EMBODIMENTS

Figure 1:
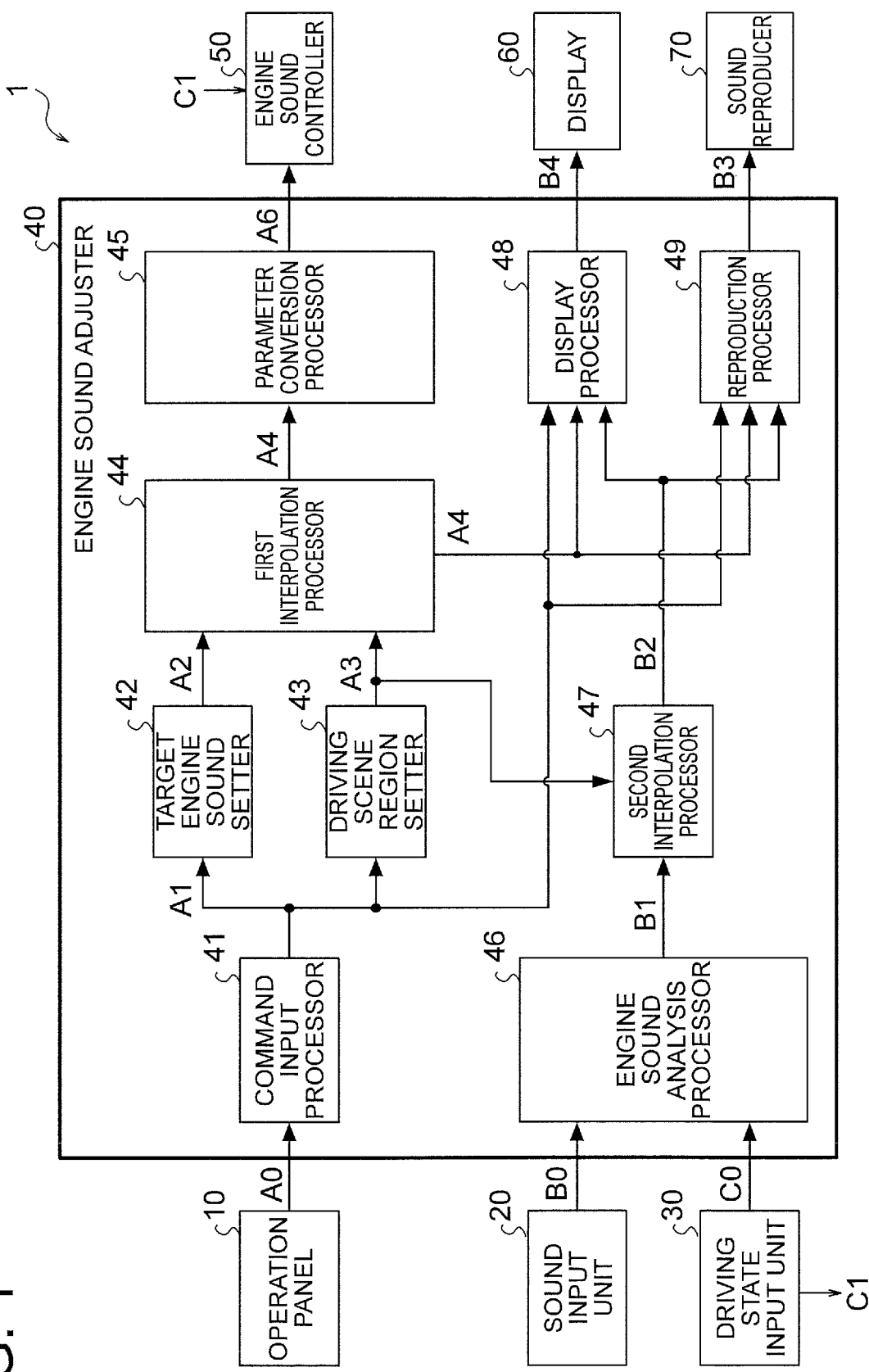
FIG. 1 is a functional block diagram schematically illustrating a configuration of an engine sound control device (in particular a configuration of an engine sound adjuster) according to a first embodiment.

Engine sound control devices, engine sound control methods, and engine sound control programs according to embodiments of the present invention will be described below with reference to the attached drawings. The following embodiments are only examples, and may be changed in various ways within the scope of the present invention. In the attached drawings, elements having like functions are given like reference characters.

<1> First Embodiment

<1-1> Configuration of Engine Sound Control Device 1

FIG. 1 is a functional block diagram schematically illustrating a configuration of an engine sound control device 1 according to a first embodiment. The engine sound control device 1 is a device capable of implementing an engine sound control method according to the first embodiment. The engine sound control device 1 is a device installed in an automobile. The engine sound control device 1 is a device for generating a control sound signal depending on a driving state of the automobile in which the engine sound control device 1 is installed, and outputting a control sound (pseudo engine sound) corresponding to the generated control sound signal to the interior of the automobile through a speaker serving as a control sound output unit (sound output unit). A driver (user) and other passengers in the automobile hear the actual engine sound (exhaust sound) and the control sound output from the speaker (i.e., the combination of the actual engine sound and control sound) and thus can feel acceleration more strongly than when the control sound is absent.

Figure 10:
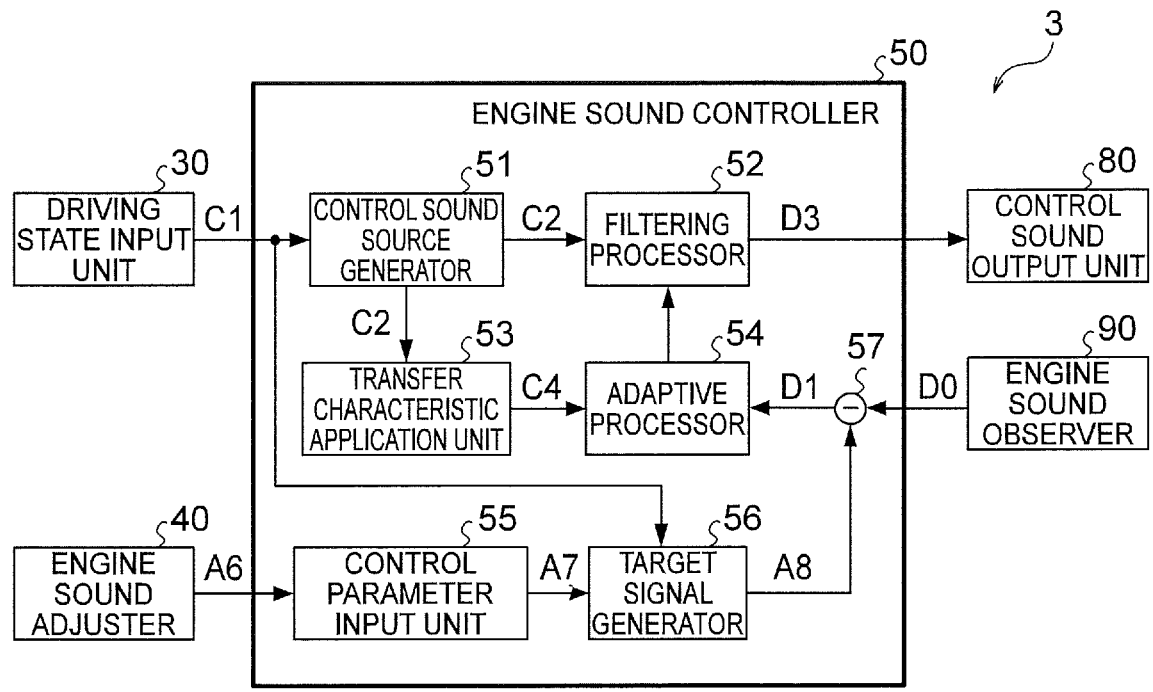
FIG. 10 is a functional block diagram schematically illustrating a configuration of an engine sound control device (in particular a configuration of an engine sound controller) according to a third embodiment.

As illustrated in FIG. 1, the engine sound control device 1 includes, as its main components, an operation panel (operation unit) 10 that receives user operations and provides user commands A0 based on the user operations, an engine sound adjuster 40 that generates an engine sound control parameter A6 based on an engine sound setting map A4 from the user commands A0, and an engine sound controller 50 that generates a control sound signal D3 on the basis of driving state data C1 indicating an actual driving state of the automobile and the engine sound control parameter A6, and provides it to the control sound output unit (illustrated in FIG. 10 to be described later). The engine sound control device 1 may also include a sound input unit 20 that provides the engine sound adjuster 40 with a sound signal B0 based on an actual engine sound of the automobile, a driving state input unit 30 that provides the engine sound adjuster 40 with driving state data C0 indicating an actual driving state of the automobile and provides the engine sound controller 50 with the driving state data C1 indicating the actual driving state of the automobile, a display 60 that displays an image based on image information (image data) B4 generated by the engine sound adjuster 40, and a sound reproducer 70 that outputs an engine sound for preview based on sound information (a sound signal) B3 generated by the engine sound adjuster 40.

The operation panel 10 is an operation unit (operation means) for a user to operate the engine sound control device 1. The operation panel 10 may include, for example, a keyboard, a mouse, a touch screen, and the like. The operation panel 10 provides the engine sound adjuster 40 with user commands A0 that are user operation signals based on user operations.

The sound input unit 20 is sound input means for providing the engine sound adjuster 40 with a sound signal (sound data) B0 based on an actual engine sound. The sound input unit 20 may include, for example, a microphone that generates a sound signal B0 corresponding to an input sound, or a sound recorder capable of recording and reproducing (outputting) a sound signal B0 obtained through a microphone.

The driving state input unit 30 is means for providing the engine sound adjuster 40 and engine sound controller 50 with driving state data C0 and C1 each indicating an actual driving state (operating state) of the automobile. The driving state input unit 30 includes, for example, an engine control unit that is provided in the automobile and that receives data indicating the actual operating state of an engine of the automobile or the like and outputs driving state data C0 and C1 indicating the operating state of the engine of the automobile, a data recorder that records driving state data C0 and C1 indicating the operation of the automobile, and the like. The driving state data C0 and C1 are parameters that affect the engine sound of the automobile, and can include an engine rotation speed, a vehicle speed, an accelerator position, an engine torque, a gear position, the amount of change in engine rotation speed per unit time, the amount of change in vehicle speed per unit time, and the like.

The engine sound adjuster 40 is engine sound adjusting means that provides the engine sound controller 50 with the engine sound control parameter A6 based on the content of user commands A0 input through the operation panel 10. The engine sound adjuster 40 also has a function of causing the display 60 to display information for assisting (supporting) user operation through the operation panel 10, and a function of enabling preview of engine sounds through the sound reproducer 70. The engine sound adjuster 40 can be implemented by a memory that stores a program, which is software, and a processor that executes the program. However, it is possible that the engine sound adjuster 40 is formed by an integrated circuit. It is also possible that a part of the engine sound adjuster 40 is formed by an integrated circuit and the other part is formed by a memory that stores a program, which is software, and a processor that executes the program.

The engine sound controller 50 is engine sound control means that generates the control sound signal D3 on the basis of the driving state data C1 and engine sound control parameter A6, and provides it to the control sound output unit (illustrated in FIG. 10 to be described later) serving as a sound output unit. The engine sound controller 50 can be implemented by a memory that stores a program, which is software, and a processor that executes the program. However, it is possible that the engine sound controller 50 is formed by an integrated circuit. It is also possible that a part of the engine sound controller 50 is formed by an integrated circuit and the other part is formed by a memory that stores a program, which is software, and a processor that executes the program. Although the memory and processor constituting the engine sound adjuster 40 and the memory and processor constituting the engine sound controller 50 are different components, it is also possible that the engine sound adjuster 40 and engine sound controller 50 are implemented by a common information processing unit constituted by a single memory and a single processor.

The display 60 is a display unit (display means) that provides a user with image information and textual information necessary for user operation for engine sound adjustment through the operation panel 10 in the form of an image. The display 60 is, for example, a monitor, such as a liquid crystal panel. The operation panel 10 and display 60 may be a touch screen that has a structure in which they are layered, and that receives touch input operation performed by the user with his/her finger. In this case, the operation panel 10 and display 60 constitute the touch screen with an integral structure.

The sound reproducer 70 is sound reproduction means that outputs a sound based on the sound signal B3 for enabling preview of a result of the engine sound adjustment. The sound reproducer 70 may include, for example, an amplifier for amplifying the sound signal B3, and a speaker or headphones for outputting sound based on the amplified sound signal.

<1-2> Configuration of Engine Sound Adjuster 40

As illustrated in FIG. 1, the engine sound adjuster 40 includes, as its main components, a command input processor 41, a target engine sound setter 42, a driving scene region setter 43, a first interpolation processor 44, and a parameter conversion processor 45. The engine sound adjuster 40 may include, as supplementary components, an engine sound analysis processor 46, a second interpolation processor 47, a display processor 48, and a reproduction processor 49.

The command input processor 41 processes the user commands A0 provided from the operation panel 10 and outputs command signals A1 based on the user commands A0.

Figure 5:
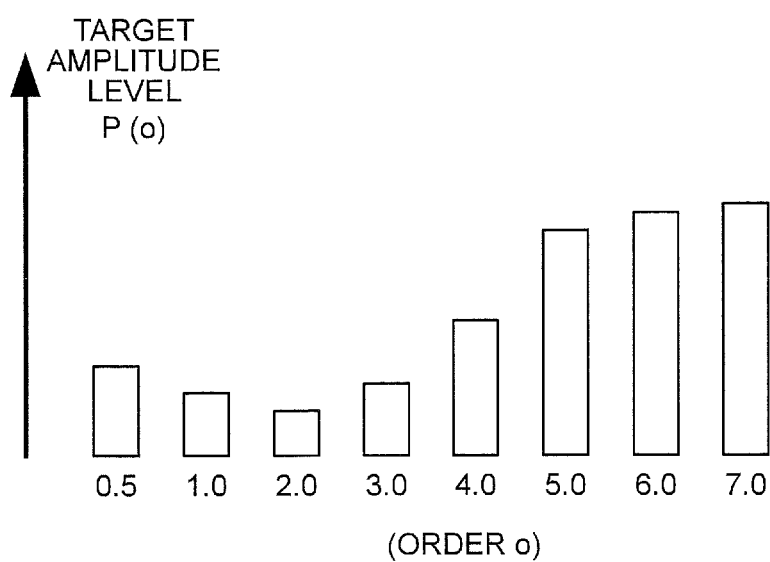
FIG. 5 is a diagram illustrating an example of target amplitude levels with respect to orders of a fundamental frequency of engine rotation of the automobile.

The target engine sound setter 42 outputs user set point information A2 that is information for setting a target engine sound at a cell (small region) identified by coordinates in a driving state space, in accordance with a command signal A1 provided from the command input processor 41. An example of the target engine sound is illustrated in FIG. 5 to be described later. The driving state space refers to a space represented by a two- or more-dimensional coordinate system with multiple parameters indicating the driving state as axes (coordinate axes), that is, a plane or a multidimensional space. Cells are small regions obtained by dividing the driving state space, and the user set point information A2 is information including specified coordinates indicating one of the cells and the amplitude (spectral information) of the target engine sound at the cell indicated by the specified coordinates. As the multiple parameters serving as the coordinate axes of the coordinate system representing the driving state space, it is possible to use variables associated with the engine sound, such as an engine rotation speed, a vehicle speed, an accelerator position, an engine torque, a gear position, the amount of change in engine rotation speed per unit time, and the amount of change in vehicle speed per unit time that relate to the automobile.

Figure 6:
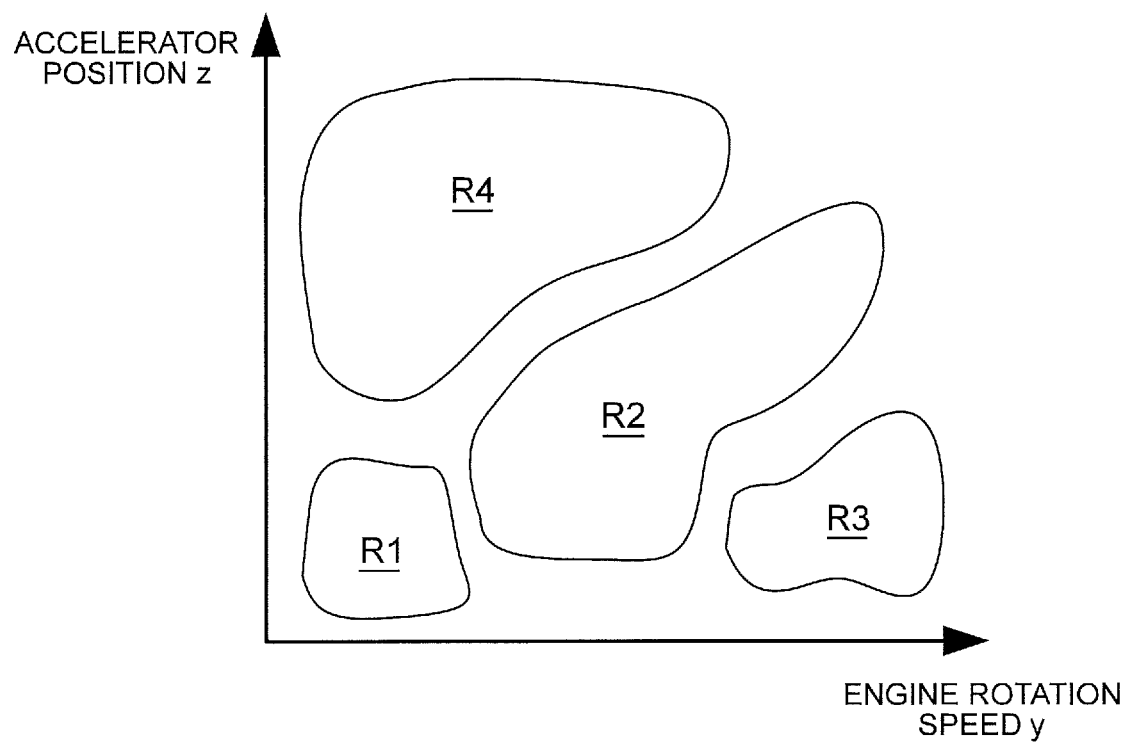
FIG. 6 is a diagram illustrating an example of driving scene region specified by the driving scene region setter illustrated in FIG. 1.
Figure 8:
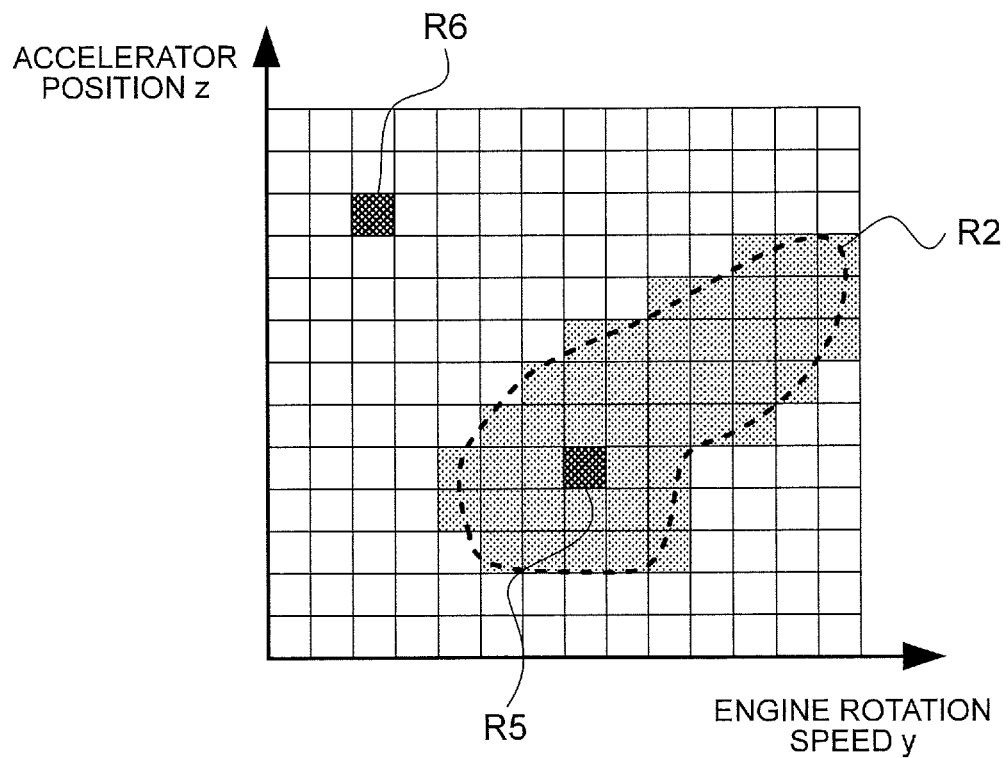
FIG. 8 is a diagram illustrating an example of user set point information, driving scene region information, and cells belonging to a driving scene region that are used by the first interpolation processor illustrated in FIG. 1 to generate an engine sound setting map constituted by multiple cells.

The driving scene region setter 43 outputs driving scene region information A3 for setting a driving scene region, in accordance with a command signal A1 provided from the command input processor 41. Examples of the driving scene region is illustrated in FIG. 6 to be described later. An example of setting of the driving scene region information is illustrated in FIG. 8 to be described later. The driving scene region is represented by a region in the driving state space, and examples thereof include a region corresponding to an idling state, a region corresponding to a moderate acceleration state, a region corresponding to an engine brake usage state, a region corresponding to a rapid acceleration state, and the like. In the first embodiment, a user can set an arbitrary number of driving scene regions associated with actual driving scenes as described above in arbitrary regions of the driving state space, depending on the user's intention.

The first interpolation processor 44 uses setting information of a target engine sound (illustrated in FIG. 8 to be described later) set at one of multiple cells constituting an engine sound setting map on the basis of the user set point information A2 provided from the target engine sound setter 42 and one or more driving scene regions (illustrated in FIG. 8 to be described later) set in the engine sound setting map on the basis of the driving scene region information A3 provided from the driving scene region setter 43, to perform a first interpolation process that is a process of calculating a target engine sound at each cell (each cell except the cell at which the target engine sound has been set on the basis of the user set point information A2) of the engine sound setting map. The engine sound setting map A4 is constituted by the multiple cells, which are formed by dividing the driving state space at predetermined intervals for each coordinate axis. The engine sound setting map A4 including the amplitude (spectral information) of the engine sound at each of the multiple cells is obtained from the user set point information A2 and first interpolation information obtained by the first interpolation process.

The parameter conversion processor 45 converts the engine sound setting map A4 generated by the first interpolation processor 44 into the engine sound control parameter A6 and provides it to the engine sound controller 50.

The engine sound analysis processor 46 receives the sound signal B0 representing the actual engine sound provided from the sound input unit 20 and the driving state data C0 indicating the actual driving state of the automobile provided from the driving state input unit 30 (e.g., at the same time), analyzes the actual engine sound on the basis of these data items, and outputs an analysis result signal B1 indicating a result of the analysis. The analysis result signal B1 is, for example, information of the same type as (but having different coordinates from) the user set point information A2 output from the target engine sound setter 42.

The second interpolation processor 47 uses actual engine sound information set at one of multiple cells constituting an engine sound analysis map on the basis of the analysis result signal B1 and one or more driving scene regions set in the engine sound analysis map B2 on the basis of the driving scene region information A3 provided from the driving scene region setter 43, to perform a second interpolation process that is a process of calculating an engine sound at each cell (each cell except the cell at which the engine sound information has been set on the basis of the analysis result signal B1) of the engine sound analysis map B2. It is desirable that the multiple cells of the engine sound analysis map B2 be the same as the multiple cells of the engine sound setting map A4 generated by the first interpolation processor 44. As the method of the second interpolation process performed by the second interpolation processor 47, it is possible to employ the same method as that of the first interpolation process performed by the first interpolation processor 44. The second interpolation processor 47 performs the second interpolation process on the analysis result signal B1 output from the engine sound analysis processor 46, thereby generating the engine sound analysis map B2. The engine sound analysis map B2 including the amplitude (spectral information) of the engine sound at each of the multiple cells is obtained from the analysis result signal B1 based on the actual engine sound and the second interpolation information obtained by the second interpolation process.

The display processor 48 outputs image information (image data) B4 for displaying, as an image, information based on a command signal A1, the engine sound setting map A4, and the engine sound analysis map B2, to the display 60.

The reproduction processor 49 outputs a sound signal B3 for outputting, as sound, information based on a command signal A1, the engine sound setting map A4, and the engine sound analysis map B2, to the sound reproducer 70.

Figure 2:
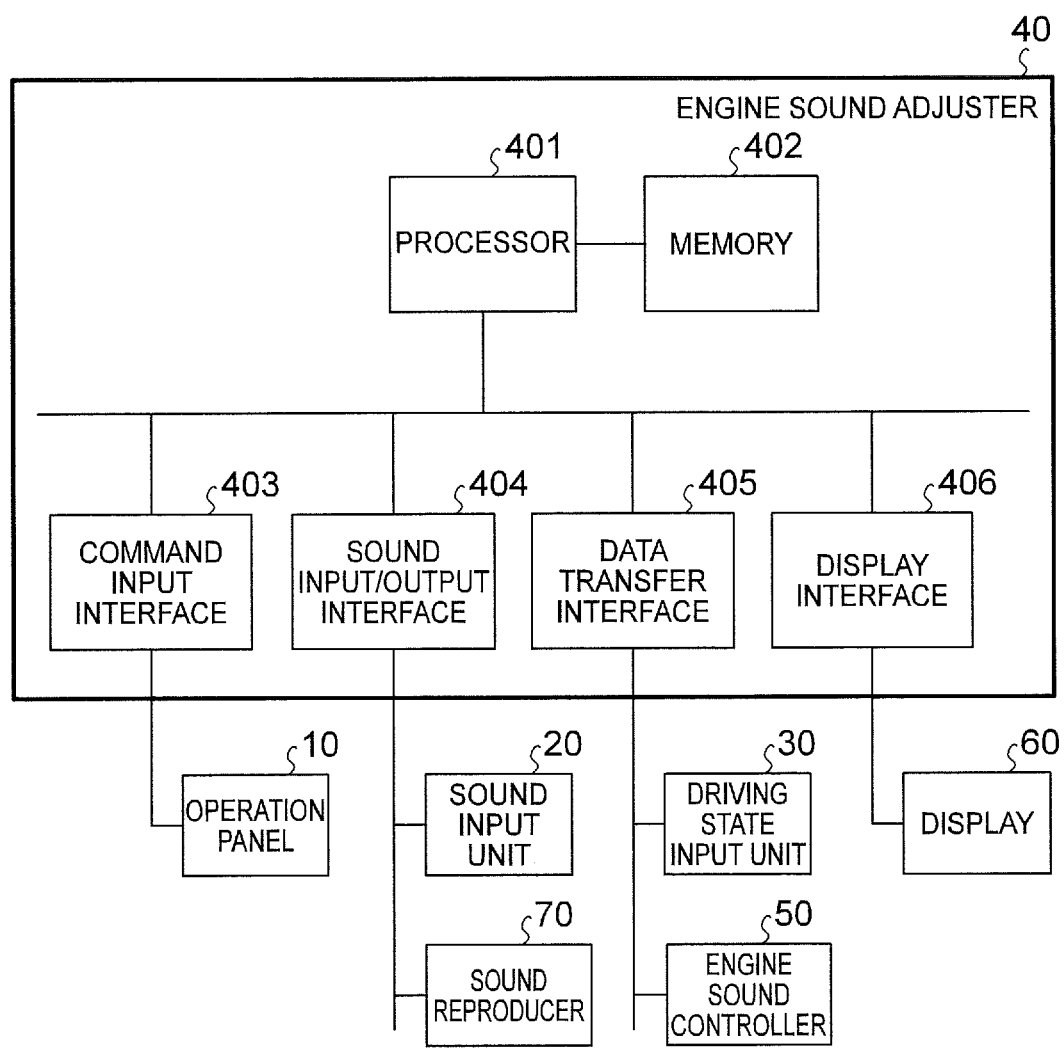
FIG. 2 is a diagram illustrating an example of a hardware configuration of the engine sound adjuster of the engine sound control device according to the first embodiment.

FIG. 2 is a diagram illustrating an example of a hardware configuration of the engine sound adjuster 40. As illustrated in FIG. 2, the engine sound adjuster 40 includes, as its main hardware components, a processor 401 as an information processor that executes programs, which are software, and a memory 402 that stores the programs, which are software, executed by the processor 401. The engine sound adjuster 40 may also include a command input interface 403, a sound input/output interface 404, a data transfer interface 405, and a display interface 406.

The programs stored in the memory 402 include an engine sound control program for implementing the engine sound control method according to the first embodiment. The processes of the command input processor 41, target engine sound setter 42, driving scene region setter 43, first interpolation processor 44, parameter conversion processor 45, engine sound analysis processor 46, second interpolation processor 47, display processor 48, and reproduction processor 49 illustrated in FIG. 1 can be implemented by the processor 401 executing the engine sound control program stored in the memory 402.

The user commands A0 generated by user operations on the operation panel 10 are provided to the processor 401 through the command input interface 403. At this time, the processor 401 executes the program, thereby performing the processes of the command input processor 41, target engine sound setter 42, driving scene region setter 43, first interpolation processor 44, and parameter conversion processor 45.

The sound signal B0 based on sound input from the sound input unit 20 is provided to the processor 401 through the sound input/output interface 404. The driving state data C0 input from the driving state input unit 30 is provided to the processor 401 through the data transfer interface 405. At this time, the processor 401 executes the program, thereby performing the processes of the engine sound analysis processor 46, second interpolation processor 47, display processor 48, and reproduction processor 49.

The processor 401 also provides the engine sound control parameter A6 to the engine sound controller 50 through the data transfer interface 405. At this time, the processor 401 executes the program, thereby performing the process of the parameter conversion processor 45.

The processor 401 also provides the image data B4 to the display 60 through the display interface 406. The processor 401 may also provide a sound signal representing a simulated engine sound for preview that simulates a control sound (pseudo engine sound) output from the engine sound controller 50, to the sound reproducer 70 through the sound input/output interface 404. At this time, the processor 401 executes the program, thereby performing the processes of the display processor 48 and reproduction processor 49.

When performing the above processes, the processor 401 uses the memory 402 as a storage area for the program and data, as appropriate. A storage portion that stores the program and a storage area for the data may be different memories.

<1-3> Operation of Engine Sound Adjuster 40

Figure 3:
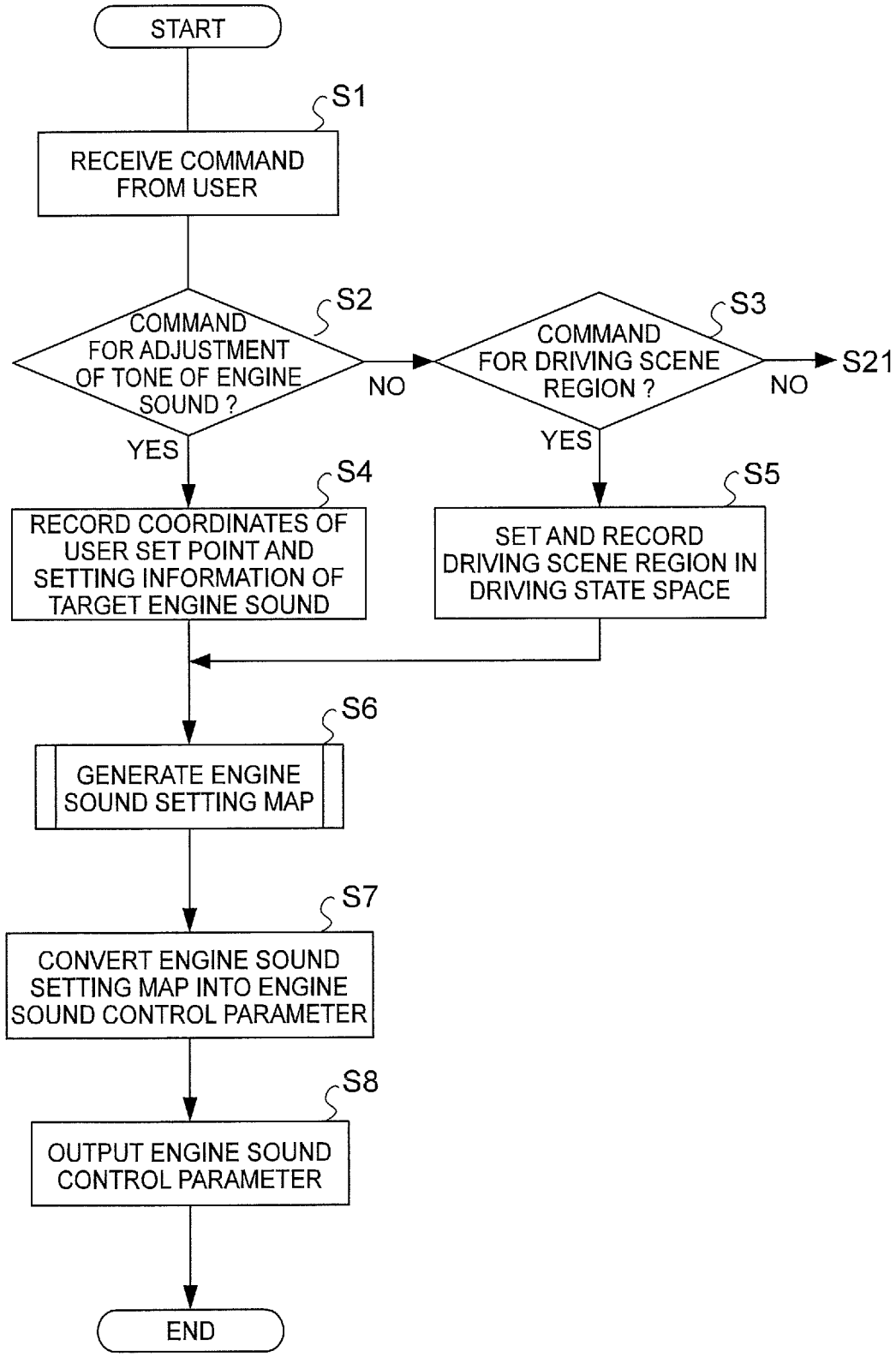
FIG. 3 is a flowchart illustrating an example of operation for generating an engine sound control parameter performed by the engine sound adjuster illustrated in FIG. 1.

FIG. 3 is a flowchart illustrating an example of operation of the engine sound adjuster 40.

First, the command input processor 41 receives a user command A0 generated by a user operation on the operation panel 10 (step S1).

The command input processor 41 determines whether the received user command A0 is a command for adjustment of the control sound signal generated by the engine sound control device 1 or a command for setting of a driving scene region (step S2).

Figure 4:
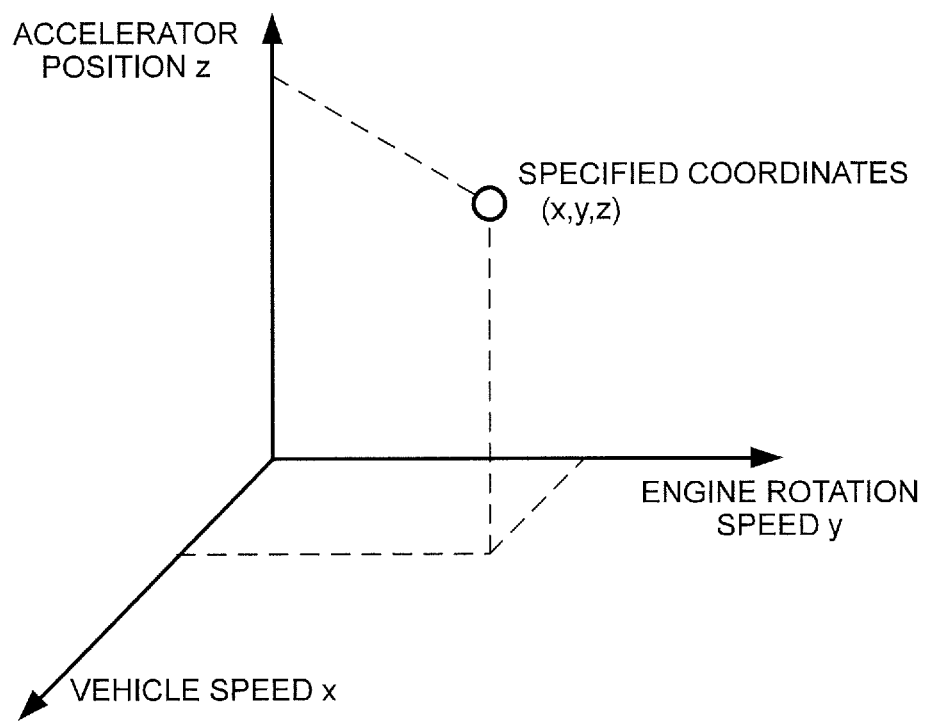
FIG. 4 is a diagram illustrating a driving state space when parameters serving as axes of the driving state space (coordinate axes of a coordinate system representing the driving state space) are a vehicle speed, an engine rotation speed, and an accelerator position of an automobile.

When the user command A0 is a command for adjustment of the control sound signal (YES in step S2), the command input processor 41 sends a command signal A1 to the target engine sound setter 42, and the target engine sound setter 42 stores, in a storage portion (e.g., the memory 402 in FIG. 2), the coordinates of a user set point and the setting information of the target engine sound at the coordinates (step S4). The combination of the coordinates of a user set point and the setting information of the target engine sound is referred to as user set point information A2. Examples of the coordinates of the user set point and the setting information of the target engine sound are illustrated in FIGS. 4, 5, and 8 (regions R5 and R6) to be described later.

When the user command A0 is a command for setting of a driving scene region (NO in step S2 and YES in step S3), the command input processor 41 sends a command signal A1 to the driving scene region setter 43, and the driving scene region setter 43 sets one or more driving scene regions in the driving state space and stores, in a storage portion (e.g., the memory 402 in FIG. 2), driving scene region information A3 indicating the set driving scene regions (step S5). Examples of the driving scene regions are illustrated in FIGS. 6 and 8 (region R2) to be described later.

Figure 9:
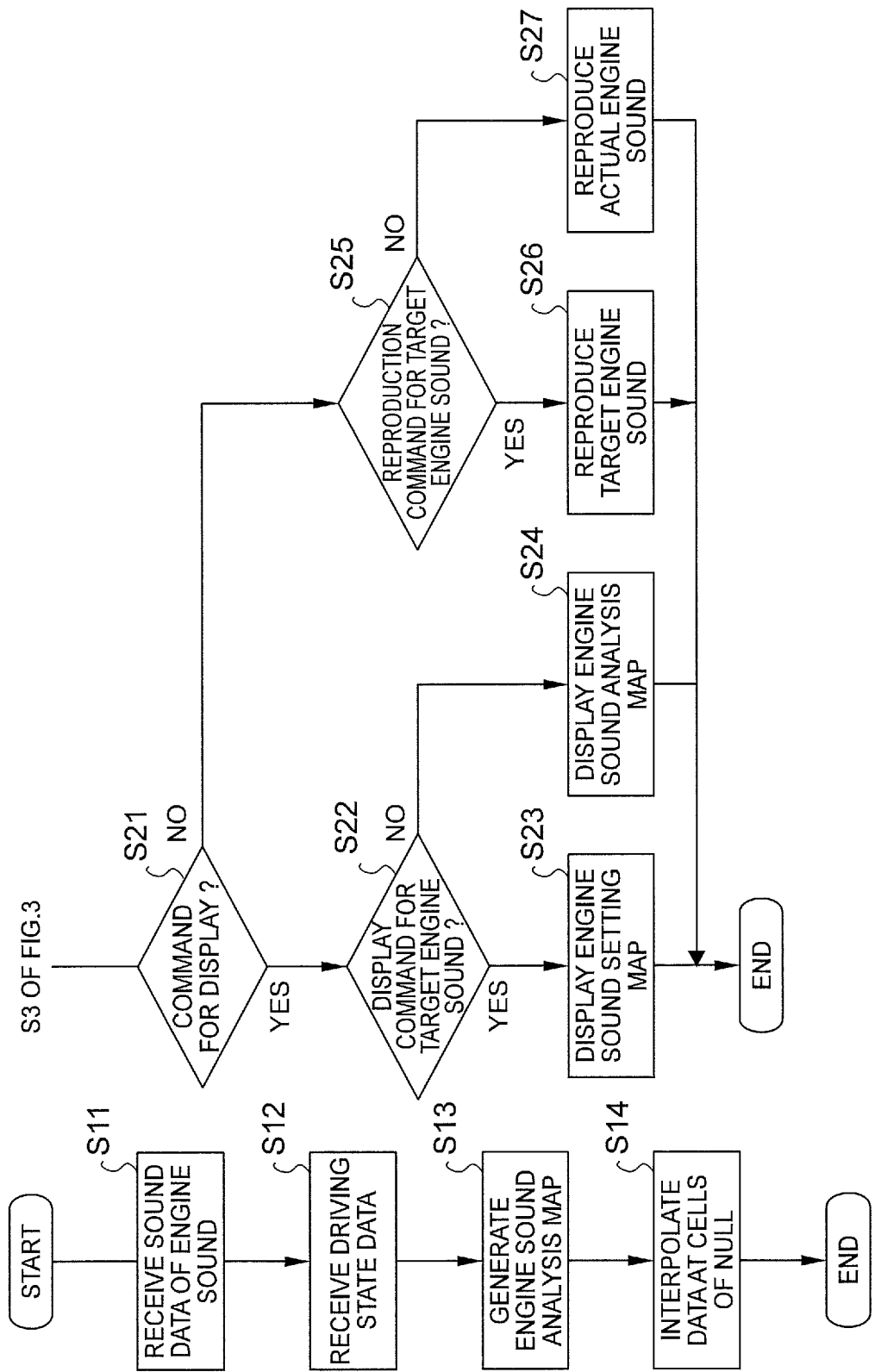
FIGS. 9A and 9B are flowcharts illustrating an example of operations for analyzing an actual engine sound and actual driving state data and displaying an image representing a result of the analysis or outputting a sound representing a result of the analysis.

A process performed when the user command A0 is another command (NO in step S2 and NO in step S3) is illustrated in FIG. 9B to be described later.

Figure 7:
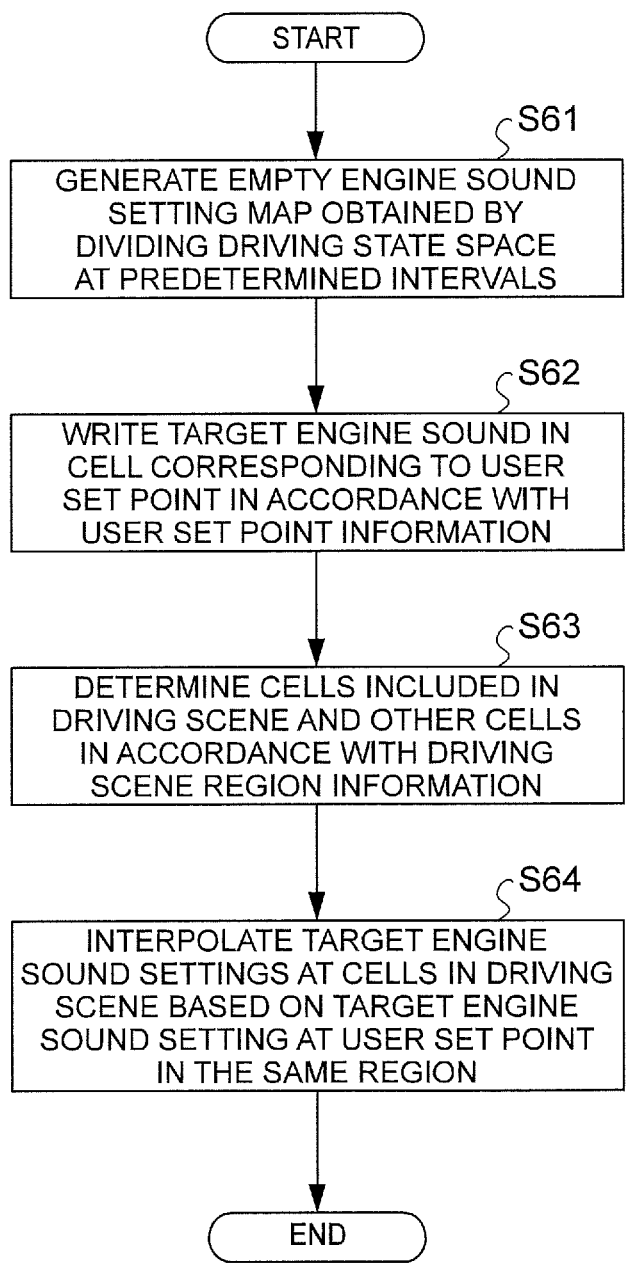
FIG. 7 is a flowchart illustrating an example of a first interpolation process performed by the first interpolation processor illustrated in FIG. 1.

The first interpolation processor 44 reads the user set point information A2 stored in the storage portion by the target engine sound setter 42 and the driving scene region information A3 stored in the storage portion by the driving scene region setter 43, and performs a first interpolation process to calculate the target engine sounds for the cells of the driving state space other than the cell at the user set point (e.g., regions R5 and R6 in FIG. 8 to be described later), thereby generating the engine sound setting map A4 and outputting it (step S6). An example of generating the engine sound setting map is illustrated in FIGS. 7 and 8 to be described later.

The parameter conversion processor 45 converts the engine sound setting map A4 generated by the first interpolation processor 44 into the engine sound control parameter A6 (step S7), and outputs the engine sound control parameter A6 to the engine sound controller 50 (step S8).

<1-4> Operation of Target Engine Sound Setter 42

A user can specify, as a command for adjustment of the engine sound, on the operation panel 10, arbitrary coordinates in the driving state space and the setting information (spectral information) of the target engine sound at the coordinates. On the basis of the user command A0 in accordance with an input operation performed on the operation panel 10, the target engine sound setter 42 sets user set point information A2 including specified coordinates indicating one of the multiple cells obtained by dividing the driving state space represented by the coordinate system with the multiple parameters indicating the driving state as the coordinate axes, and the spectral information (amplitude) of the target engine sound at the cell indicated by the specified coordinates.

FIG. 4 is a diagram illustrating an example of the driving state space when a vehicle speed, an engine rotation speed, and an accelerator position are used as the multiple parameters serving as the coordinate axes of the coordinate system representing the driving state space. Here, the user specifies, as specified coordinates, a set of a vehicle speed x, an engine rotation speed y, and an accelerator position z, i.e., coordinates (x, y, z). The multiple parameters can include two or more of an engine rotation speed, a vehicle speed, an accelerator position, an engine torque, a gear position, the amount of change in engine rotation speed per unit time, and the amount of change in vehicle speed per unit time that relate to the automobile.

The setting information of the target engine sound at the specified coordinates specifies the tone and volume of the target engine sound, and is, for example, specified by the shape of a frequency spectrum $G(f)$. Here, f is frequency and takes discrete values at predetermined intervals. $G(f)$ represents the amplitude level of the engine sound at frequency f. Since f takes multiple values, $G(f)$ represents the spectrum of the amplitude level of the engine sound.

The setting information of the target engine sound may be represented by sets of an order (factor) o with respect to a fundamental frequency of the engine rotation and an amplitude level $P(o)$ with respect to the order o. In general, when the engine rotation speed (i.e., rotational frequency) is taken as a first harmonic fundamental frequency, the engine sound of an automobile consists of components at frequencies obtained by multiplying the fundamental frequency by predetermined orders (factors). For example, when the engine rotation speed is 1000 revolutions per minute, the fundamental frequency is 16.6666 . . . Hz, which is obtained by division of 1000 revolutions by 60 seconds, and for a four-stroke, four-cylinder engine, a frequency component at 33.3333 . . . Hz, which is a second harmonic of (two times) the fundamental frequency, a frequency component at 66.6666 . . . Hz, which is a fourth harmonic of (four times) the fundamental frequency, and the like appear. Here, when the engine rotation speed is changed to 1500 revolutions per minute, the fundamental frequency becomes 25 Hz, which is obtained by division of 1500 revolutions by 60 seconds, and the second harmonic becomes 50 Hz and the fourth harmonic becomes 100 Hz.

Such characteristics of engine sound show that it is not always necessary to set the target engine sound for all frequencies, and it is possible to define the tone and volume of the target engine sound merely by specifying orders o and the target amplitude levels $P(o)$ at the orders o. Such use of the amplitude levels $P(o)$ reduces the data size and can reduce the effort of the setting input by a user, compared to when the frequency spectrum $G(f)$ is used.

FIG. 5 is a diagram illustrating an example of the target amplitude levels $P(o)$ with respect to orders o of a fundamental frequency of engine rotation. The orders o are real numbers greater than zero. FIG. 5 illustrates eight orders o, but the values of and the number of orders o, or how many orders o can be selected are/is not limited.

In accordance with the command signal A1 based on the user command A0, the target engine sound setter 42 stores, as user set point information, in the storage portion (e.g., memory 402), the specified coordinates (FIG. 4) in the driving state space specified by the user and the setting information (FIG. 5) of the target engine sound at the specified coordinates. This process corresponds to the process of step S4 in FIG. 3. The specified coordinates in the driving state space specified by the user are referred to as a "user set point."

The user can input an arbitrary number of items of user set point information as described above by command input using the operation panel 10. The user set point information may be input for a subset of the multiple cells of the driving state space; for the other cells, spectral information is interpolated by the first interpolation process.

<1-5> Operation of Driving Scene Region Setter 43

The user can specify, as a command for setting of a driving scene region, one or more arbitrary regions in the driving state space as one or more driving scene regions. The driving scene region setter 43 sets one or more regions in the driving state space specified by command input as one or more driving scene regions, and stores it in the memory 402 as driving scene region information. This process corresponds to the process of step S5 in FIG. 3. A driving scene region is a region set for distinguishing a driving scene in the driving state space.

FIG. 6 is a diagram illustrating an example of the one or more driving scene regions specified by the driving scene region setter 43. In FIG. 6, as an example of the driving scene regions, four driving scene regions R1, R2, R3, and R4 are set in the driving state space having two axes of the accelerator position z and engine rotation speed y. Here, for simplicity, the driving scene regions are illustrated as regions in a plane (two-dimensional coordinate system) with two axes; however, the driving scene regions are not limited to regions in a plane with two axes, and may be regions defined in a multidimensional space with three or more axes (three- or more-dimensional coordinate system. For example, region R1, where the accelerator position z and engine rotation speed y are both small, corresponds to an idling state, which is a driving scene. Region R2 corresponds to a moderate acceleration state. Region R3 corresponds to an engine brake usage state. Region R4 corresponds to a rapid acceleration state. In the engine sound control device 1 according to the first embodiment, the user can set an arbitrary number of driving scene regions associated with actual driving scenes as described above in arbitrary regions of the driving state space, depending on the user's intention.

<1-6> Operation of First Interpolation Processor 44

The first interpolation processor 44 reads the user set point information A2 stored in the storage portion (e.g., memory 402) by the target engine sound setter 42 and the driving scene region information A3 stored in the storage portion (memory 402) by the driving scene region setter 43, and performs a first interpolation process to calculate the target engine sounds at the coordinates in the driving state space other than the user set point(s), thereby generating the engine sound setting map. This process corresponds to the process of step S6 in FIG. 3.

FIG. 7 is a flowchart illustrating an example of the first interpolation process (step S6 in FIG. 3) performed by the first interpolation processor 44. FIG. 8 is a diagram illustrating an example of the engine sound setting map generated by the first interpolation processor 44.

First, the first interpolation processor 44 prepares the engine sound setting map that is empty and corresponds to the driving state space (step S61). As illustrated in FIG. 8, the engine sound setting map is to specify a target engine sound for each of cells, which are small regions (small square regions in FIG. 8), obtained by dividing the driving state space at predetermined intervals for each coordinate axis. In FIG. 8, the driving state space is divided into a grid by multiple straight lines (horizontal lines) extending in the y axis direction and multiple straight lines (vertical lines) extending in the z axis direction, so that the multiple cells are formed; a target engine sound can be set (by the user and the first interpolation process) for each of the multiple cells. Initially (before a user command A0 is input), the engine sound setting map is in a state where no target engine sound is set for each of the multiple cells, i.e., in a null state.

Then, in accordance with the user set point information A2, the first interpolation processor 44 writes the setting information of the target engine sound in each of the cell(s) (e.g., regions R5 and R6 in FIG. 8) corresponding to the user set point(s) in the engine sound setting map (step S62).

Then, in accordance with the driving scene region information A3, the first interpolation processor 44 determines cells that are included in a driving scene region and cells that are not included therein (step S63). In FIG. 8, region R2 enclosed by the dashed boundary line represents a driving scene region, and shaded cells represent cells belonging to the driving scene region. For each of the cells through which the boundary line (dashed line) of region R2 passes, whether the cell is a cell belonging to the driving scene region is determined according to a predetermined criterion. For example, a cell is determined to be a cell belonging to the driving scene region when the ratio of the area of the cell within region R2 (inside the boundary line) to the area of the cell is greater than or equal to a predetermined threshold value. Also, for example, when the driving scene region is three-dimensional, a cell is determined to be a cell belonging to the driving scene region when the ratio of the volume of the cell within region R2 (inside the boundary surface) to the volume of the cell is greater than or equal to a predetermined threshold value. However, the determination method is not limited to this example.

Then, the first interpolation processor 44 performs a first interpolation process to calculate the setting information of the target engine sound for each of the cells at the coordinates other than the coordinates of the user set point(s) (step S64). The first interpolation process is performed by using the setting information of the target engine sound(s) at the cell(s) at the user set point(s), and distances from the cell(s) at the user set point(s) to the cells (first interpolation target cells) for which the target engine sounds are to be calculated.

For example, when there are first to M-th (M being a positive integer) user set points (i.e., M user set points), distances (or first to M-th distances) from the first to M-th user set points to each of the first interpolation target cells (the cells other than the cells of the first to M-th user set points) are calculated. Then, the engine sound for each first interpolation target cell is calculated (interpolated) by using an arithmetic expression such that user set points having smaller distances (closer) to the first interpolation target cell more greatly affect the engine sound for the first interpolation target cell.

Specifically, when the number of user set points is denoted by M, the number of first interpolation target cells is denoted by N (N being a positive integer), a distance between the m-th (m being an integer greater than or equal to 1 and less than or equal to M) user set point and the n-th (n being an integer greater than or equal to 1 and less than or equal to N) first interpolation target cell is denoted by $l_{mn}$, and the spectral information of the target engine sound for the m-th user set point is denoted by $G_m(f)$, the spectral information $G_n(f)$, i.e., amplitude information, of the target engine sound for the n-th first interpolation target cell is calculated by the following equations (1) and (2), which are a first arithmetic expression:

$$G_n(f)=\Sigma_{m=1}^M G_m(f)(L_n-l_{mn})/L_n, \quad (1)$$

$$L_n=\Sigma_{m=1}^M l_{mn}. \quad (2)$$

At this time, if a part of a straight line connecting the cell at the m-th user set point and the n-th first interpolation target cell (straight line connecting the cells) is within a driving scene region to which the m-th user set point belongs, a distance of the part within the driving scene region (or within the cells belonging to the driving scene region) is corrected by multiplying it by a factor $\alpha$ predetermined within a range of $0<\alpha<1$. Thereby, a corrected distance $l'_{mn}$ less than the actual distance $l_{mn}$ between the cells is calculated. Specifically, when of the actual distance $l_{mn}$ between the cells (the length of the straight line connecting the cells), the distance of the part within the driving scene region is denoted by $p_{mn}$, and the distance of the other part is denoted by $q_{mn}$, the following equation (3) holds:

$$l_{mn}=p_{mn}+q_{mn}. \quad (3)$$

The corrected distance $l'_{mn}$ less than the distance $l_{mn}$ is calculated by replacing the distance $p_{mn}$ of the part within the driving scene region of the straight line connecting the cells with a corrected distance $\alpha \cdot p_{mn}$, and the spectral information $G_n(f)$, i.e., amplitude information, of the target engine sound for the n-th first interpolation target cell is calculated by the following equations (4) and (5), which are a second arithmetic expression:

$$G_n(f)=\Sigma_{m=1}^M G_m(f)(L_n-l'_{mn})/L_n' \quad (4)$$

$$l'_{mn}=\alpha \cdot p_{mn}+q_{mn}. \quad (5)$$

Thus, the first interpolation processor 44 calculates the engine sound for a first interpolation target cell by using the first arithmetic expression such that the smaller the distance between a cell for which the user set point information A2 is set and the first interpolation target cell, the greater the effect of the user set point information A2 on the engine sound for the first interpolation target cell. However, when a cell belonging to a driving scene region exists between the cell for which the user set point information A2 is set and the first interpolation target cell, the first interpolation processor 44 calculates the engine sound for the first interpolation target cell by using the second arithmetic expression such that the smaller the distance between the cell for which the user set point information A2 is set and the first interpolation target cell, the greater the effect of the user set point information A2 on the engine sound for the first interpolation target cell, and the effect of the user set point information A2 on the engine sound for the first interpolation target cell is greater than when no cell belonging to the driving scene region exists between the cell for which the user set point information A2 is set and the first interpolation target cell.

Thereby, it is possible to enhance, in and near a driving scene region (i.e., in the region of the cells belonging to the driving scene region), the effects of user set points in the driving scene region, compared to the other user set points (thus, $G_n(f)$ in equation (4) has a value greater than that of $G_n(f)$ in equation (1)), and to cause them to gradually decrease with distance from the driving scene region. As a result, the user need not set the target engine sounds for all the N cells, and can easily perform adjustment of the engine sound appropriate for driving scene region(s) merely by setting the driving scene region(s) and the target engine sound(s) for user set point(s) that are representative coordinates.

The interpolation method using equations (1) to (5) is only an example, and other computational expressions may be used. For example, instead of the distance $l_{mn}$ and distance $l'_{mn}$ in equations (1) to (5), a power of the distance $l_{mn}$ and a power of the distance $l'_{mn}$ may be used.

Also, instead of the value $(L_n-l_{mn})$ by which $G_n(f)$ is multiplied in equation (1), a function (e.g., a Gaussian function or a sinc function) that gradually decreases as the distance $l_{mn}$ increases. The same applies to equation (4).

Also, existing interpolation methods, such as linear interpolation or spline interpolation, may be used as appropriate.

<1-6> Operation of Parameter Conversion Processor 45

The parameter conversion processor 45 converts the engine sound setting map generated by the first interpolation processor 44 into the engine sound control parameter A6 in conformity to a format required by the engine sound controller 50, and outputs it to the engine sound controller 50. This process corresponds to the processes of steps S7 and S8 in FIG. 3. The engine sound control parameter A6 includes at least the spectral information of the target engine sound at each driving state in accordance with the engine sound setting map.

<1-7> Supplemental Operation for Engine Sound Adjustment

The engine sound control device 1 according to the first embodiment includes the engine sound analysis processor 46, second interpolation processor 47, display processor 48, and reproduction processor 49, which serve as means for supporting the engine sound adjustment and as means for analyzing an actual engine sound recorded while the automobile is actually running and driving state data at that time and providing a user with a result of the analysis.

FIGS. 9A and 9B are flowcharts of an operation of analyzing an engine sound and driving state data recorded in the automobile that is actually running and performing display.

The engine sound analysis processor 46 receives a sound signal B0 representing an actual engine sound from the sound input unit 20 (step S11). The engine sound analysis processor 46 also receives driving state data C0 of the automobile from the driving state input unit 30 (step S12). The sound signal B0 and driving state data C0 may be received in real time from the automobile that is actually running, or may be recorded in a data recorder or the like and received after the running.

Then, the engine sound analysis processor 46 analyzes the sound signal B0 of the engine sound and the driving state data C0, and generates the engine sound analysis map as an analysis result signal (step S13). The engine sound analysis map is a map in which the actual engine sound is projected to the driving state space, and has the same coordinate axes and cells as the above-described engine sound setting map A4. The engine sound analysis processor 46 reads a part of the sound data of the engine sound and a part of the driving state data at predetermined time steps, selects a cell corresponding to the read driving state from the engine sound analysis map, and stores, as the engine sound at the cell, spectral information obtained by analyzing the read sound data. The engine sounds at cells that do not correspond to any of the parts of the driving state data are left null.

Then, the second interpolation processor 47 performs the second interpolation process for second interpolation target cells that are the cells left null in the engine sound analysis map (step S14). As the interpolation method, it is possible to use the same method as the above-described first interpolation process in steps S63 and S64 by the first interpolation processor 44. At this time, in the engine sound analysis processor 46, a cell for which the engine sound is stored in the engine sound analysis map is treated in the same manner as a cell at a user set point in the engine sound setting map A4.

Following the process of step S3 in FIG. 3, the command input processor 41 determines whether the user command A0 is a command for display (step S21).

When the user command A0 is a command for display, the command input processor 41 further determines whether it is a display command for the target engine sounds (step S22). When the command is a display command for the target engine sounds, a command signal A1 based on the user command A0 is sent to the display processor 48, and the display processor 48 outputs the engine sound setting map A4 generated by the first interpolation processor 44 to the display 60 and causes the display 60 to display the engine sound setting map (step S23).

When the command is a display command for the engine sound analysis map B2, the display processor 48 outputs the engine sound analysis map B2 generated by the second interpolation processor 47 to the display 60 and causes the display 60 to display the engine sound analysis map (step S24).

The display 60 may numerically or graphically display the spectral information at each cell of the engine sound setting map A4 or engine sound analysis map B2. Also, the display 60 may display the magnitude of the amplitude level of a frequency component or harmonic component arbitrarily specified by the user in the driving state space in the form of a contour map or a three-dimensional graph.

When the user command A0 is not a command for display in step S21, the command input processor 41 determines the user command A0 as a command for reproduction of an engine sound, and further determines whether it is a reproduction command for a target engine sound (step S25).

When it is a reproduction command for a target engine sound, a command signal A1 based on the user command A0 is sent to the reproduction processor 49, and the reproduction processor 49 generates a sound waveform of the target engine sound in accordance with the engine sound setting map and outputs a sound signal B3 based on the sound waveform to the sound reproducer 70 (step S26). Otherwise, the reproduction processor 49 generates a sound waveform on the basis of the result of the analysis of the actual engine sound in accordance with the engine sound analysis map and outputs a sound signal B3 based on the sound waveform to the sound reproducer 70 (step S27).

At this time, a user can specify a driving state for which the engine sound is to be reproduced, using the coordinates in the driving state space. The reproduction processor 49 reads, from the engine sound setting map A4 or engine sound analysis map B2, the spectral information of the engine sound at the cell at the coordinates specified by the user, and generates the sound waveform. Also, a user can specify different multiple sets of coordinates arranged in a chronological order. In this case, the reproduction processor 49 simulates a situation where the driving state changes in accordance with the sets of coordinates arranged in the chronological order, and generates and outputs a sound waveform of the engine sound.

<1-8> Advantages of First Embodiment

As described above, the engine sound control device 1 and engine sound control method according to the first embodiment set a driving scene region in accordance with designation by the user, and perform the interpolation of the engine sound setting map A4 within the driving scene region in accordance with the user set point information in the driving scene region, which makes it possible to perform adjustment of the engine sound depending on the driving scene with less effort (e.g., merely by inputting the user set point information at regions R5 and R6 in FIG. 8).

Further, with the engine sound control device 1 and engine sound control method according to the first embodiment, it is possible to generate the engine sound analysis map B2 by analyzing the sound signal B0 of the actual engine sound and the driving state data C0 and performing the interpolation, and display it so that it can be compared to the engine sound setting map A4 generated on the basis of user commands A0. Further, it is possible to preview control sounds (pseudo engine sounds) generated on the basis of the engine sound setting map A4 generated on the basis of user commands A0, and preview engine sounds based on the analysis result generated on the basis of the engine sound analysis map B2 generated from the actual engine sound. This facilitates visually or auditorily checking the result of the adjustment of the engine sound, which can make the operation for adjustment of the engine sound more efficient.

Further, the engine sound control device 1 and engine sound control method according to the first embodiment simulate a variation in the driving state in accordance with sets of coordinates in the driving state space specified by a user in a chronological order and generate a sound waveform of the engine sound, and thereby make it possible to check the engine sound in a state closer to actual driving, which makes it possible to check the result of the adjustment of the engine sound in a more vivid way.

<2> Second Embodiment

While in the first embodiment, a user inputs, through the operation panel 10, specified coordinates (FIG. 4) in the driving state space and the target engine sound(s) (FIG. 5) at the specified coordinates, in an engine sound control device according to a second embodiment, instead of the target engine sound(s), a user inputs difference value(s) from the spectral information at the respective cell(s) of the engine sound analysis map generated by the second interpolation processor 47.

While the engine sound control device according to the second embodiment includes the same main components as the engine sound control device 1 according to the first embodiment, it differs from the engine sound control device 1 according to the first embodiment in that for the coordinates of the user set point(s), the first interpolation processor 44 receives the spectral information at the respective cell(s) of the engine sound analysis map B2 generated by the second interpolation processor 47. This configuration makes it possible for a user to input, instead of the target engine sound(s), difference value(s) from the spectral information at the respective cell(s) of the engine sound analysis map generated by the second interpolation processor 47.

This makes it sufficient to input adjustment values to set the target engine sounds only for points where a change should be made to the actual engine sound, and thus can further reduce the effort required for the adjustment.

As described above, the engine sound control device according to the second embodiment is configured so that difference values from actual engine sounds are specified; this makes it sufficient to input adjustment values only for points where a change should be made, and thus can further reduce the effort required for the adjustment.

<3> Third Embodiment

In the above first embodiment, the engine sound controller 50 generates the control sound signal D3 on the basis of the driving state data C1 indicating the actual driving state of the automobile and the engine sound control parameter A6, and provides it to the control sound output unit. An engine sound control device 3 according to a third embodiment differs from the engine sound control device 1 according to the first embodiment in that an engine sound controller 50 has a configuration illustrated in FIG. 10. Otherwise, the third embodiment is the same as the first or second embodiment.

FIG. 10 is a functional block diagram schematically illustrating a configuration of the engine sound control device 3 according to the third embodiment. As illustrated in FIG. 10, the engine sound control device 3 includes a driving state input unit 30, an engine sound adjuster 40, the engine sound controller 50, a control sound output unit 80, and an engine sound observer 90.

The driving state input unit 30 and engine sound adjuster 40 are the same as those described in the first embodiment.

The control sound output unit 80 is a sound output unit for outputting a control sound (pseudo engine sound) generated by the engine sound control device 3. The control sound output unit 80 may include, for example, a speaker or the like. By outputting the control sound from the control sound output unit 80, it is possible to make engine sound reaching the ears of the driver (user) and other passengers in the automobile, i.e., the combination of the actual engine sound and the control sound generated by the engine sound control device 3, closer to the target engine sound set by the user.

The engine sound observer 90 is means for observing the combination of the actual engine sound and the control sound generated by the engine sound control device 3, and outputs an observed signal D0 corresponding to the observed sound. The engine sound observer 90 may include, for example, a microphone.

As illustrated in FIG. 10, the engine sound controller 50 includes a control sound source generator 51, a filtering processor 52, a transfer characteristic application unit 53, an adaptive processor 54, a control parameter input unit 55, a target signal generator 56, and a subtractor 57.

The control sound source generator 51 generates an original sound signal C2 serving as a sound source of the control sound signal D3, on the basis of the driving state data C1 provided from the driving state input unit 30.

The filtering processor 52 performs a filtering process on the original sound signal C2 generated by the control sound source generator 51 to generate the control sound signal D3 that causes the control sound to be output.

The transfer characteristic application unit 53 applies an acoustic transfer characteristic from the control sound output unit 80 to the engine sound observer 90, to the original sound signal C2.

The control parameter input unit 55 receives the engine sound control parameter A6 provided from the engine sound adjuster 40 and outputs it as spectral information A7 of the target engine sounds.

The target signal generator 56 generates a target engine sound signal A8 representing the target engine sound on the basis of the spectral information A7 of the target engine sound based on the driving state data C1 and engine sound control parameter A6.

The subtractor 57 outputs an error signal D1 obtained by subtracting the target engine sound signal A8 from the observed signal D0 obtained by observing the combination of the actual engine sound and the control sound.

The adaptive processor 54 determines the content of the filtering process by the filtering processor 52 on the basis of an original sound waveform C4 obtained by the application of the acoustic transfer characteristic and the error signal (error waveform) D1. Specifically, the adaptive processor 54 performs an adaptive process to change filter coefficients of the filtering processor 52 so that the error between the value of the target engine sound signal A8 and the value of the observed signal D0 approaches zero.

Figure 11:
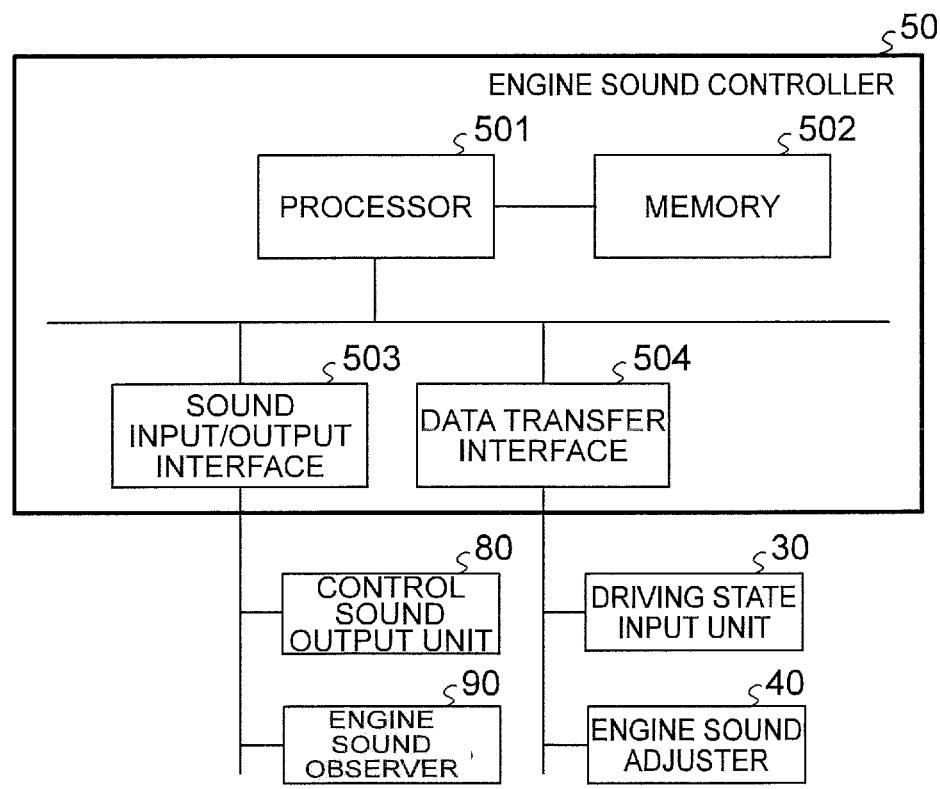
FIG. 11 is a diagram illustrating an example of a hardware configuration of the engine sound controller of the engine sound control device according to the third embodiment.

FIG. 11 is a diagram illustrating an example of a hardware configuration of the engine sound controller 50. As illustrated in FIG. 11, the engine sound controller 50 includes a processor 501, a memory 502, a sound input/output interface 503, and a data transfer interface 504.

The engine sound control parameter A6 output from the engine sound adjuster 40 is supplied to the processor 501 through the data transfer interface 504, and the processor 501 performs the process of the control parameter input unit 55 of FIG. 10 by executing a program.

The driving state data provided from the driving state input unit 30 is supplied to the processor 501 through the data transfer interface 504, and the processor 501 performs the processes of the control sound source generator 51 and target signal generator 56 by executing programs.

The control sound signal D3 output from the filtering processor 52 is supplied from the processor 501 to the sound input/output interface 503, and the processor 501 provides the control sound based on the control sound signal D3 to the control sound output unit 80 by executing a program.

The signal based on the sound observed by the engine sound observer 90 is supplied to the processor 501 through the sound input/output interface 503, and the processor 501 performs the process of the subtractor 57 by executing a program. When performing these processes, the processor 501 uses the memory 502 as a storage area for the programs and data as appropriate.

Figure 12:
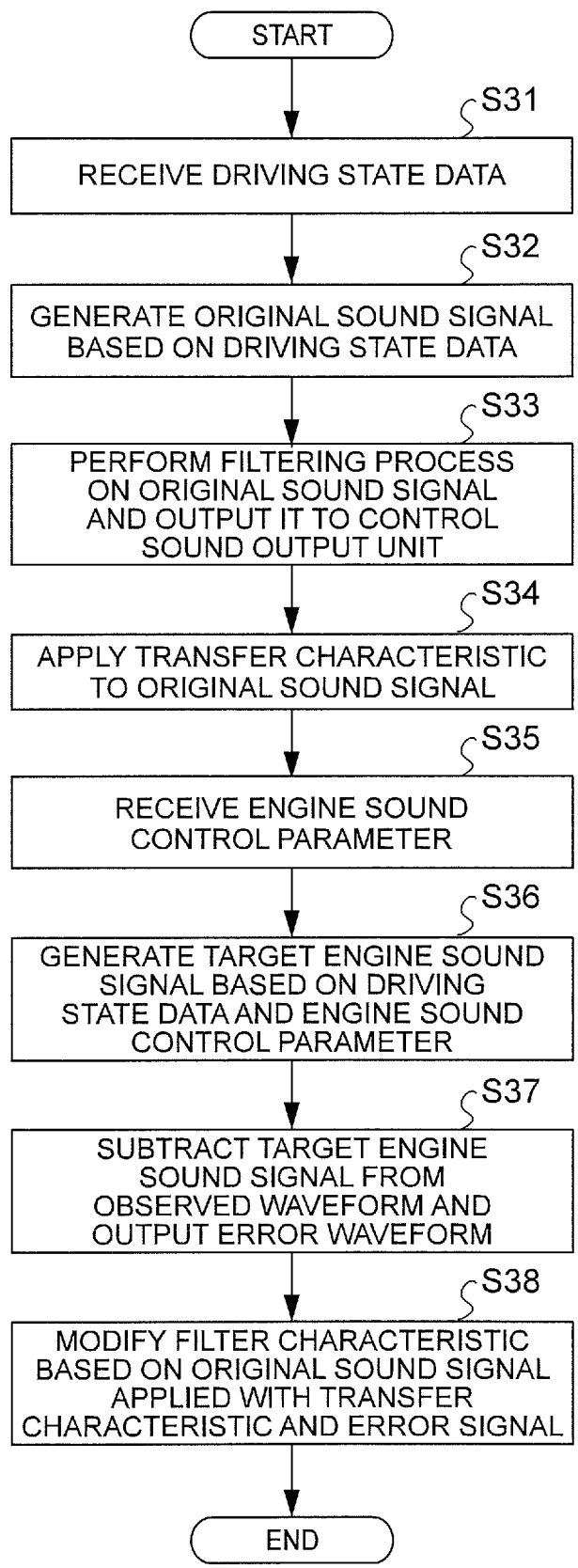
FIG. 12 is a flowchart illustrating an example of an operation for controlling a control sound performed by the engine sound controller of the engine sound control device according to the third embodiment.

FIG. 12 is a flowchart illustrating an example of an engine sound control operation performed by the engine sound controller 50 of the engine sound control device 3 according to the third embodiment.

The control sound source generator 51 receives the driving state data C1 of the automobile from the driving state input unit 30 (step S31).

The control sound source generator 51 generates the original sound signal C2 serving as an origin of the control sound on the basis of information, such as the engine rotation speed, included in the received driving state data C1 and related to a sound source of the engine sound, and outputs the generated original sound signal C2 (step S32).

The filtering processor 52 performs the filtering process on the original sound signal C2, thereby generating the control sound signal D3 for generating the control sound and outputs the generated control sound signal D3 to the control sound output unit 80 (step S33).

The transfer characteristic application unit 53 applies, to the original sound signal C2, the acoustic transfer characteristic, which is previously determined by a measurement, from the control sound output unit 80 to the engine sound observer 90 (step S34). This process is to have the acoustic transfer characteristic taken into account in the adaptive process in the adaptive processor 54 to be described later. This process is, for example, a signal process known as the filtered-X algorithm.

Meanwhile, the control parameter input unit 55 receives the engine sound control parameter A6 from the engine sound adjuster 40 (step S35).

The target signal generator 56 reads, from the engine sound control parameter A6, the spectral information A7 of the target engine sound corresponding to the current driving state received from the driving state input unit 30, and generates the target engine sound signal A8 on the basis of the spectral information A7 (step S36).

The combination of the actual engine sound and the control sound output from the control sound output unit 80 is observed by the engine sound observer 90, and is input as the observed signal D0 to the subtractor 57.

The subtractor 57 outputs, as the error signal D1, the result of subtraction of the target engine sound signal A8 from the observed signal D0 (step S37).

The adaptive processor 54 modifies the filter characteristic of the filtering processor 52 on the basis of the original sound signal C4 to which the acoustic transfer characteristic is applied by the transfer characteristic application unit 53 and the error signal D1 so that the amplitude of the error signal D1 decreases (step S38). For this process, adaptive signal processing algorithms, such as the least means square (LMS), may be used.

As described above, the engine sound control device 3 according to the third embodiment performs the adaptive process to change the characteristic of the filtering processor 52 on the basis of the error signal D1 between the target engine sound signal A8 generated on the basis of the engine sound control parameter A6 and the observed signal D0, and thereby can provide a user with high-quality engine sound (the combination of the actual engine sound and the control sound) equivalent to the target engine sound set by the user.

REFERENCE SIGNS LIST 1, 3 engine sound control device, 10 operation panel (operation unit), 20 sound input unit, 30 driving state input unit, 40 engine sound adjuster, 41 command input processor, 42 target engine sound setter, 43 driving scene region setter, 44 first interpolation processor, 45 parameter conversion processor, 46 engine sound analysis processor, 47 second interpolation processor, 48 display processor, 49 reproduction processor, 50 engine sound controller, 51 control sound source generator, 52 filtering processor, 53 transfer characteristic application unit, 54 adaptive processor, 55 control parameter input unit, 56 target signal generator, 57 subtractor, 60 display, 70 sound reproducer, 80 control sound output unit (sound output unit), 90 engine sound observer, 401, 501 processor, 402, 502 memory, C0 user command, C1 command signal, A2 user set point information, A3 driving scene region information, A4 engine sound setting map, A6 engine sound control parameter, A7 spectral information of target engine sound, A8 target engine sound signal, B0 sound signal, B1 analysis result signal, B2 engine sound analysis map, B3 sound signal, B4 image information, C0, C1 driving state data, C2 original sound signal, C4 original sound signal subjected to application of acoustic transfer characteristic, D0 observed signal, D1 error signal, D3 control sound signal, R1-R4 driving scene region.

The invention claimed is:

1. An engine sound control device to cause a sound output unit to output a control sound depending on a driving state of an automobile that affects engine sound of the automobile, the engine sound control device comprising:
   a target engine sound setter to set user set point information on a basis of a user command in accordance with input operation performed by a user on an operation unit, the user set point information including specified coordinates indicating one of a plurality of cells obtained by dividing a driving state space represented by a coordinate system with a plurality of parameters indicating the driving state as coordinate axes, and spectral information of a target engine sound at the cell indicated by the specified coordinates;
   a driving scene region setter to set driving scene region information indicating a driving scene region in the driving state space, on a basis of the user command;
   a first interpolation processor to perform a first interpolation process to calculate spectral information of an engine sound for each of one or more first interpolation target cells that are one or more cells of the plurality of cells for which the user set point information is not set, on a basis of the user set point information and the driving scene region information, and generate an engine sound setting map including spectral information of an engine sound at each of the plurality of cells, from the user set point information and first interpolation information obtained by the first interpolation process;
   a parameter conversion processor to output an engine sound control parameter based on the engine sound setting map; and
   an engine sound controller to cause the sound output unit to output the control sound based on the engine sound control parameter.

2. The engine sound control device of claim 1, wherein the first interpolation processor
   calculates the engine sound for each of the first interpolation target cells by using a first arithmetic expression such that the smaller a distance between the cell at which the user set point information is set and the first interpolation target cell, the greater an effect of the user set point information on the engine sound for the first interpolation target cell, and
   when a cell belonging to the driving scene region exists between the cell at which the user set point information is set and the first interpolation target cell, calculates the engine sound for the first interpolation target cell by using a second arithmetic expression such that the smaller a distance between the cell at which the user set point information is set and the first interpolation target cell, the greater an effect of the user set point information on the engine sound for the first interpolation target cell, and the effect of the user set point information on the engine sound for the first interpolation target cell is greater than when no cell belonging to the driving scene region exists between the cell at which the user set point information is set and the first interpolation target cell.

3. The engine sound control device of claim 1, wherein the plurality of parameters include two or more of an engine rotation speed, a vehicle speed, an accelerator position, an engine torque, a gear position, an amount of change in engine rotation speed per unit time, and an amount of change in vehicle speed per unit time that relate to the automobile.

4. The engine sound control device of claim 1, further comprising a second interpolation processor to perform, on a basis of information indicating an actual engine sound of the automobile, driving state data indicating an actual driving state of the automobile, and the driving scene region information, a second interpolation process to calculate spectral information of an engine sound for each of one or more second interpolation target cells that are one or more cells of the plurality of cells of the driving state space for which information of the actual engine sound is not set, and generate an engine sound analysis map including spectral information of an engine sound at each of the plurality of cells, from the information of the actual engine sound and second interpolation information obtained by the second interpolation process.

5. The engine sound control device of claim 4, further comprising a display processor to cause a display to display an image based on the engine sound setting map and an image based on the engine sound analysis map.

6. The engine sound control device of claim 4, further comprising a reproduction processor to cause a sound reproducer to output a sound based on the engine sound setting map and a sound based on the engine sound analysis map.

7. The engine sound control device of claim 4, wherein operation information input through the operation unit is a difference value from the spectral information of the engine sound analysis map; and
the target engine sound setter provides the first interpolation processor with a target engine sound generated from the difference value and the spectral information of the engine sound analysis map.

8. The engine sound control device of claim 1, wherein the engine sound controller is configured:
to generate an original sound signal from driving state data indicating an actual driving state of the automobile;
to perform a filtering process on the original sound signal to generate a control sound signal that causes the control sound to be output;
to apply an acoustic transfer characteristic to the original sound signal;
to generate a target engine sound signal based on the driving state data and the engine sound control parameter;
to output an error signal obtained by subtracting the target engine sound signal from an observed signal obtained by observing a combination of an actual engine sound and the control sound; and
to determine a content of the filtering process on a basis of an original sound waveform obtained by the application of the acoustic transfer characteristic and the error signal.

9. An engine sound control method for causing a sound output unit to output a control sound depending on a driving state of an automobile that affects engine sound of the automobile, the engine sound control method comprising:
setting user set point information on a basis of a user command in accordance with input operation performed by a user on an operation unit, the user set point information including specified coordinates indicating one of a plurality of cells obtained by dividing a driving state space represented by a coordinate system with a plurality of parameters indicating the driving state as coordinate axes, and spectral information of a target engine sound at the cell indicated by the specified coordinates;
setting driving scene region information indicating a driving scene region in the driving state space, on a basis of the user command;
performing a first interpolation process to calculate spectral information of an engine sound for each of one or more first interpolation target cells that are one or more cells of the plurality of cells for which the user set point information is not set, on a basis of the user set point information and the driving scene region information, and generating an engine sound setting map including spectral information of an engine sound at each of the plurality of cells, from the user set point information and first interpolation information obtained by the first interpolation process;
outputting an engine sound control parameter based on the engine sound setting map; and
causing the sound output unit to output the control sound based on the engine sound control parameter.

10. A non-transitory computer readable storage medium storing an engine sound control program for causing a computer to execute a user process for causing a sound output unit to output a control sound depending on a driving state of an automobile that affects engine sound of the automobile, the engine sound control program causing the computer to execute:
a target engine sound setting process of setting user set point information on a basis of a user command in accordance with input operation performed by a user on an operation unit, the user set point information including specified coordinates indicating one of a plurality of cells obtained by dividing a driving state space represented by a coordinate system with a plurality of parameters indicating the driving state as coordinate axes, and spectral information of a target engine sound at the cell indicated by the specified coordinates;
a driving scene region setting process of setting driving scene region information indicating a driving scene region in the driving state space, on a basis of the user command;
a first interpolation process of performing a first interpolation process to calculate spectral information of an engine sound for each of one or more first interpolation target cells that are one or more cells of the plurality of cells for which the user set point information is not set, on a basis of the user set point information and the driving scene region information, and generating an engine sound setting map including spectral information of an engine sound at each of the plurality of cells, from the user set point information and first interpolation information obtained by the first interpolation process;
a parameter conversion process of outputting an engine sound control parameter based on the engine sound setting map; and
a control sound generation process of causing the sound output unit to output the control sound based on the engine sound control parameter.

* * * * *